United States Patent [19]

Karino et al.

[11] Patent Number: 4,592,326

[45] Date of Patent: Jun. 3, 1986

[54] FUEL INJECTION APPARATUS

[75] Inventors: Kimiji Karino; Yoshiyuki Tanabe, both of Katsuta, Japan

[73] Assignee: Hitachi, Ltd., Tokyo, Japan

[21] Appl. No.: 638,269

[22] Filed: Aug. 6, 1984

[30] Foreign Application Priority Data

Aug. 9, 1983 [JP] Japan ................................ 58-145851

[51] Int. Cl.[4] ........................ F02M 51/00; G01F 1/68

[52] U.S. Cl. ........................................ 123/494; 73/204

[58] Field of Search ............... 123/470, 471, 472, 494; 73/118, 204

[56] References Cited

U.S. PATENT DOCUMENTS 4,264,961 4/1981 Nishimura et al. ............. 123/494 X

FOREIGN PATENT DOCUMENTS 2082252 3/1982 United Kingdom .

*Primary Examiner*—Tony M. Argenbright

*Attorney, Agent, or Firm*—Antonelli, Terry & Wands

[57] ABSTRACT

A fuel injection apparatus is disclosed which includes two intake tubes each having a throttle valve, a fuel injection valve for injecting fuel into each of the intake tubes, a hot-wire type air flowmeter for measuring the quantity of intake air sucked into the intake tubes, and a by-pass passage which accommodates the detection portion of the hot-wire type air flowmeter. The by-pass passage has an inlet portion for introducing the static pressure of flow of the intake air sucked into each intake tube, a central portion for passing en bloc the air introduced from each intake tube and an outlet portion for discharging into each intake tube the air passing through the central portion. The detection portion of the hot-wire type air flowmeter is disposed in the central portion of the by-pass passage. Thus, the air flowmeter is able to obtain an output having reduced pulsations.

4 Claims, 5 Drawing Figures

FUEL INJECTION APPARATUS

BACKGROUND OF THE INVENTION

The present invention relates to a fuel injection apparatus and, more particularly, to a fuel injection apparatus provided with a plurality of intake tubes for supplying an air-fuel mixture to an engine having a plurality of cylinders.

Engines having a relatively large piston displacement are generally constructed as V-engines or horizontally opposed engines for the purpose of reducing the size and weight of the engines. To supply an air-fuel mixture to these engines with high accuracy, in, for example, U.K. Patent application No. GB 2,082,252 A, a fuel injection apparatus is proposed wherein a plurality of intake tubes and a plurality of fuel injection valves, respectively corresponding to the plurality of intake manifolds are provided, with the intake tubes being respectively provided with throttle valves, adapted to be simultaneously opened or closed. A hot-wire type air flowmeter measures the quantity of air sucked into the intake tubes, and the detection portion of the air flowmeter is disposed in a by-pass passage which allows a quantity of air to pass that is proportional to the quantity of air sucked into the intake tubes.

The fuel above proposed fuel injection apparatus is arranged such that the outlets of the by-pass passage are respectively disposed inside the intake tubes but inlets of the by-pass passage are respectively disposed outside the intake tubes. For this reason, the intake air pulsation produced by the operation of the engine is transmitted also to the by-pass passage, causing disorder of the output of the hot-wire type air flowmeter. Accordingly, there is a reduction in accuracy in the measurement of the quantity of air which is actually sucked into the engine, so that the quantity of fuel injected by each of the fuel injection valves, controlled by the output of the hot-wire type air flowmeter, deviates from the amount actually necessary thus causing the control of air-fuel ratio to deteriorate and the fuel combustibility in the cylinders of the engine to be impaired, disadvantageously lowering exhaust characteristics, performance and output of the engine and increasing fuel consumption.

Accordingly, it is an object of the present invention to provide a fuel injection apparatus which increases the measurement accuracy of the quantity of intake air effected by the hot-wire type air flowmeter which has a hot-wire or resistance layer as a detection portion thereof and enable a high accurate fuel injection required for the measured quantity of air.

To this end, according to the invention, a fuel injection apparatus comprises a plurality of intake tubes each having a throttle valve; a fuel injection valve for injecting fuel into each of the intake tubes; a hot-wire type air flowmeter for measuring the quantity of intake air sucked into the intake tubes; and a by-pass passage which accommodates the detection portion of the hot-wire type air flowmeter. The by-pass passage has an inlet portion for introducing the static pressure of flow of the intake air sucked into each intake tube, a central portion for passing en bloc the air introduced from each of the intake tubes and an outlet portion for discharging into each intake tube the air passing through the central portion, with the detection portion of the hot-wire type air flowmeter being disposed in the central portion of the by-pass passage.

Each of the inlets of the by-pass passage is preferably provided in the side wall of an injector holder accommodating the corresponding fuel injection valve or the side wall of the corresponding intake tube.

DETAILED DESCRIPTION

Figure 1:
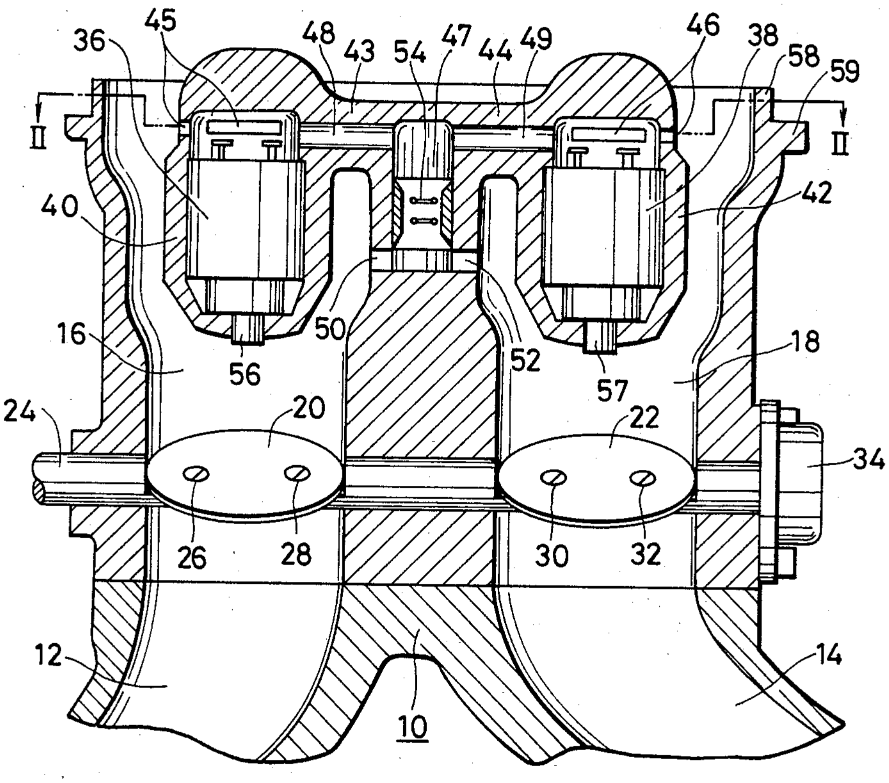
FIG. 1 is a vertical sectional view of a fuel injection apparatus in accordance with one embodiment of the present invention.
Figure 2:
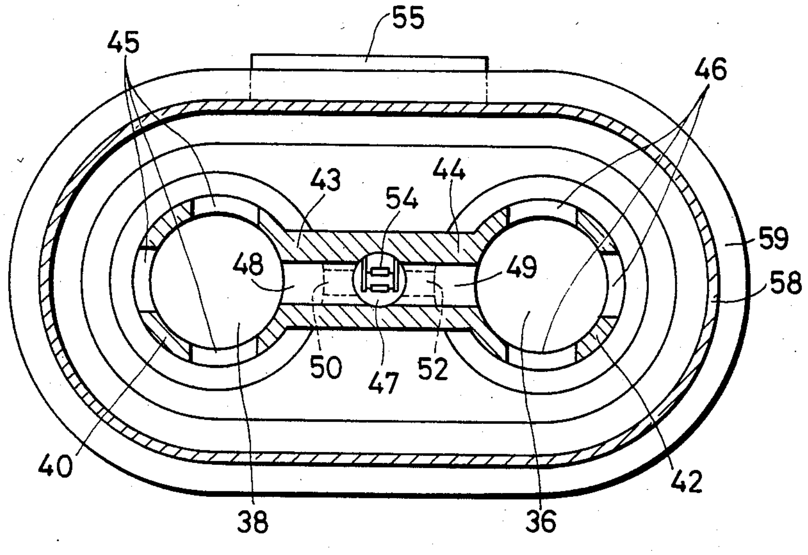
FIG. 2 is a sectional view taken along the line II—II of FIG. 1.

Referring now to the drawings, wherein like reference numerals are used throughout the various views to designate like parts and, more particularly, to FIGS. 1 and 2, according to the present invention, a fuel injection apparatus includes an intake manifold body 10 having intake manifolds 12, 14 which are divided for two systems, with one intake manifold 12 supplying an air-fuel mixture to one group of engine cylinders, not shown, and the other intake manifold 14 supplying an air-fuel mixture to another group of engine cylinders, not shown. An intake tube 16 is associated with the intake manifold 12, and an intake tube 18 is associated with the intake manifold, with the intake tubes 16, 18 being respectively provided therein with throttle valves 20, 22. These throttle valves 20, 22 are mounted on a rotatable shaft 24 by respective pairs of bolts 26, 28 and 30, 32. A throttle sensor 34 is mounted on an end portion of the shaft 24 to detect the rotational position, angular acceleration or the like of the shaft 24. Injector holders 40, 42, respectively incorporating injectors 36, 38, are disposed in the respective upper portions of the intake tubes 16, 18. The injector holders 40, 42 are connected to the respective side walls of the intake tubes 16, 18 which are closer to the central portion therebetween through respective mounting portions 43, 44. The injector holders 40, 42 are respectively provided in their side surfaces (the surfaces extending coincidently with the intake air flowing direction) with a plurality of by-pass passage inlets 45, 46. A by-pass passage 47 is provided in the central portion between the intake tubes 16 and 18, with an upper part of the by-pass passage 47 being communicated with the by-pass passage inlets 45, 46 through respective passages 48, 49 provided in the mounting portions 43, 44, while the lower part of the by-pass passage 47 is communicated with by-pass passage outlets 50, 52 provided in the respective side walls of the intake tubes 16, 18. The by-pass passage 47 is provided therein with the detection portion of a hot-wire type air flowmeter, that is, a hot wire 54. A body portion 55 of the hot-wire type air flowmeter, which accommodates the detection circuit thereof, is mounted outside the intake tubes 16, 18. The intake tubes 16, 18 have an integral upper side wall 58, which is provided with a collar portion 59 for mounting an air cleaner, not shown.

In the fuel injection apparatus of FIGS. 1 and 2 when an operator, for example, depresses an acceleration pedal, not shown, the shaft 24 is rotated to open the throttle valves 20, 22, whereby air is sucked into the intake tubes 16, 18. A portion of the air sucked in flows through the by-pass passsage inlets 45, 46, the passage 48, 49, the by-pass passage 47 and the by-pass passage outlets 50, 52, with the portion of air being proportional in quantity to the entire amount of air sucked into the intake tubes 16, 18.

An air flow rate is detected by the hot wire 54 of the air flowmeter disposed inside the by-pass passage 47, and fuel is injected from respective nozzles 56, 57 of the injectors 36, 38 in accordance with the detected air flow rate. Thus, an air-fuel mixture with a predetermined air-fuel ratio is supplied into the engine cylinders through the intake manifolds 12, 14.

Figure 3A:
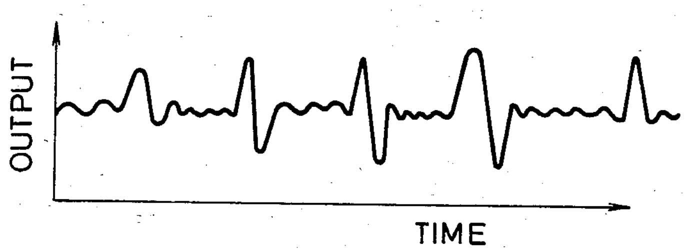
FIG. 3A is a graphical illustration of the output characteristics of a prior art hot-wire type air flowmeter.
Figure 3B:
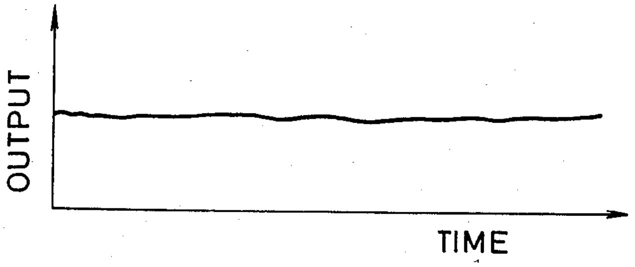
FIG. 3B is a graphical illustration of the output characteristics of a hot-wire type air flowmeter of the present invention.

In the embodiment of FIGS. 1 and 2 even if an intake air pulsation produced by the engine operation or other cause is transmitted into the intake tubes 16, 18, the pulsation is prevented from reaching the by-pass passage 47 in which the hot wire 54 is disposed due to the fact that the by-pass passage inlet and outlet 45, 50 and the by-pass passage inlet and outlet 46, 52, respectively, exist in the same intake tubes 16, 18. Further, the pressure waves transmitted to the by-pass passage inlets 45, 46 are cancelled out substantially in the upper part of the by-pass passage 47. Accordingly, the output of the hot-wire type air flowmeter exhibits the characteristics shown in FIG. 3B and has no disorder such as that shown in FIG. 3A. In addition, the quantities of air passing through the by-pass passage 47 and respectively discharged into the intake tubes 16, 18 from the by-pass passage outlets 50, 52 are substantially equal to each other. Accordingly, it becomes possible to effect a stable air-fuel ratio control, so that there are great improvements in exhaust characteristics, performance, output and fuel consumption of the engine. Thus, the invention offers great practical advantages.

Figure 4:
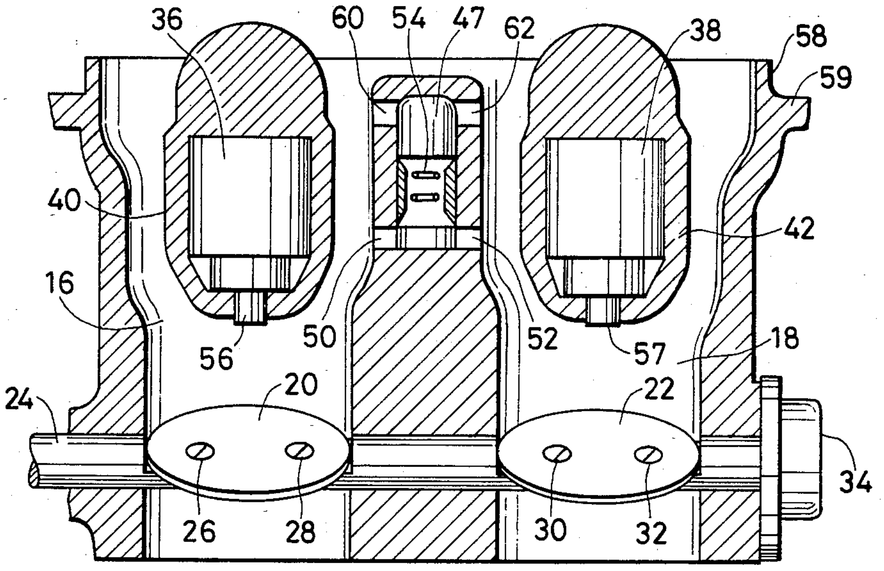
FIG. 4 is a vertical sectional view of a fuel injection apparatus in accordance with another embodiment of the present invention.

Although, in the embodiment shown in FIGS. 1 and 2 by-pass passage inlets are respectively provided in the side walls of the injector holders 40, 42, in embodiment of FIG. 4, by-pass passage inlets 60, 62 are respectively provided in side walls of the intake tubes 16, 18. Also in the fuel injection apparatus in accordance with the embodiment of FIG. 4, the static pressures of the flow of air sucked into the intake tubes 16, 18 are introduced into the by-pass passage 47 from the respective by-pass passage inlets 60, 62, thereby making it possible to prevent the intake air pulsation from being transmitted to the detection hot wire 54 of the air flowmeter provided in the by-pass passage 47. Thus, the air flowmeter output is kept free from pulsations.

The present invention, having the above-described construction, makes it possible to increase the measuring accuracy of the hot-wire type air flowmeter, so that it becomes possible to effect a stable air-fuel ratio control, thereby allowing improvements in exhaust characteristics, performance, output and fuel consumption of the engine.

What is claimed is:

1. A fuel injection apparatus comprising:

a plurality of intake tubes each having therein a throttle valve;

a fuel injection valve associated with each of said intake tubes for respectively injecting fuel into each of said intake tubes;

a hot-wire type air flowmeter for measuring a quantity of intake air sucked into said intake tube; and a bypass passage disposed centrally in an upper porton of said plurality of intake tubes for passing a quantity of air which is proportional to the intake air quantity and provided therein with a flow rate detecting portion of said hot-wire type air flow meter, wherein said by-pass passage has an inlet portion for introducing a static pressure of the flow of the intake air sucked into each intake tube, a central portion for introducing the entire quantity of air introduced from each intake tube, and an outlet portion for discharging the air passing through said central portion into each intake tube, and the flow rate detecting portion of said hot-wire type air flow meter is disposed in the central portion of said by-pass passage.

2. A fuel injection apparatus according to claim 1, wherein two intake tubes are disposed in parallel, and the central portion of said by-pass passage is disposed in a mutual side wall between said intake tubes.

3. A fuel injection apparatus according to claim 1, wherein each of said intake tubes respectively accommodates said fuel injection valve and an injector holder is disposed therein substantially concentric with an inner wall of the intake tubes, and the inlet portion of said by-pass passage is disposed on a side wall of said injector holder.

4. A fuel injection apparatus according to claim 1, wherein there are two of said intake tubes disposed in parallel, each intake tube accommodating therein said fuel injection valve and having therein an injector holder which is disposed such as to be substantially concentrical with the inner wall of the intake tube, and the inlet portion of said by-pass passage is disposed on a side wall of said injector holder, while the central portion of said by-pass passage is disposed in the mutual side wall between said intake tubes, and further a passage providing communication between the inlet and central portions of said by-pass passage is provided inside a mounting member for mounting said injector holder to the corresponding intake tube.

* * * * *